US012495296B2

(12) United States Patent
Ferdi et al.

(10) Patent No.: US 12,495,296 B2
(45) Date of Patent: Dec. 9, 2025

(54) UNMANNED AERIAL VEHICLE AUTHENTICATION AND AUTHORIZATION BY UNMANNED AERIAL SYSTEM TRAFFIC MANAGEMENT OVER USER PLANE

(71) Applicant: InterDigital Patent Holdings, Inc., Wilmington, DE (US)

(72) Inventors: Samir Ferdi, Kirkland (CA); Alec Brusilovsky, Downingtown, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 563 days.

(21) Appl. No.: 17/799,345

(22) PCT Filed: Feb. 12, 2021

(86) PCT No.: PCT/US2021/017834
§ 371 (c)(1),
(2) Date: Aug. 12, 2022

(87) PCT Pub. No.: WO2021/163463
PCT Pub. Date: Aug. 19, 2021

(65) Prior Publication Data
US 2023/0133187 A1 May 4, 2023

Related U.S. Application Data

(60) Provisional application No. 62/976,120, filed on Feb. 13, 2020.

(51) Int. Cl.
*H04W 12/06* (2021.01)
*H04L 9/40* (2022.01)
(52) U.S. Cl.
CPC .......... *H04W 12/068* (2021.01); *H04L 63/08* (2013.01)

(58) Field of Classification Search
CPC ..... H04W 12/068; H04L 63/08; H04L 63/083
(Continued)

(56) References Cited

U.S. PATENT DOCUMENTS 10,911,421 B1 * 2/2021 Golwalkar .......... H04L 63/0853
11,546,757 B2 * 1/2023 Kunz ................. H04L 63/0892
(Continued)

FOREIGN PATENT DOCUMENTS

JP 2017-526280 A 9/2017
WO 2019/245004 A1 12/2019

OTHER PUBLICATIONS

Yapp, "UAV as a service: Enabling on-demand access and on-the-fly re-tasking of multi-tenant UAVs using cloud services", IEEE Publication Date: Sep. 1, 2016, 2016, pp. 1-8 (Year: 2016).*
(Continued)

*Primary Examiner* — Juan A Torres
(74) *Attorney, Agent, or Firm* — Condo Roccia Koptiw LLP

(57) ABSTRACT

An unmanned aerial vehicle (UAV) authentication and authorization may be performed by a third-party service provider (e.g., an unmanned aerial system traffic management (UTM) over a user plane (UP)). An UAV may be configured to send an UAV ID to a network. The UAV may receive, from the network, security information that indicates an authorization of a connection to a third-party service provider. The UAV may establish, based on the security information, the connection to the third-party service provider for communications with the third-party service provider. The security information may include signature information of the third-party service provider, and one or more of a subscription identifier (ID) associated with the UAV, the UAV ID, or an ID of the third-party service provider.

20 Claims, 11 Drawing Sheets

(58) Field of Classification Search
USPC .......................................................... 455/411
See application file for complete search history.

(56) References Cited

U.S. PATENT DOCUMENTS

| | | | |
|---|---|---|---|
| 2011/0035592 A1* | 2/2011 | Cha ....................... | H04L 63/205 713/169 |
| 2013/0227658 A1* | 8/2013 | Leicher ............... | H04L 63/0876 726/5 |
| 2016/0288905 A1 | 10/2016 | Gong et al. | |
| 2016/0300492 A1 | 10/2016 | Pasko et al. | |
| 2017/0006571 A1 | 1/2017 | Allen et al. | |
| 2018/0054315 A1* | 2/2018 | Liu ....................... | H04L 9/0861 |
| 2018/0130017 A1* | 5/2018 | Gupte ................ | G06Q 10/0836 |
| 2018/0253092 A1* | 9/2018 | Trapero Esteban . | G05D 1/0022 |
| 2021/0227596 A1 | 7/2021 | Aramoto et al. | |
| 2022/0277657 A1* | 9/2022 | Xiang ..................... | G08G 5/22 |

OTHER PUBLICATIONS

3rd Generation Partnership Project (3GPP), TR 22.825 V16.0.0, "Technical Specification Group Services and System Aspects, Remote Identification of Unmanned Aerial Systems, Stage 1 (Release 16)", Sep. 2018, pp. 1-22.

3rd Generation Partnership Project (3GPP), TR 22.829 V1.0.0, "Technical Specification Group Services and System Aspects, Study on Enhancement for Unmanned Aerial Vehicles, Stage 1 (Release 17)", Mar. 2019, pp. 1-42.

3rd Generation Partnership Project (3GPP), TR 23.754 V0.1.0, "Technical Specification Group Services and System Aspects, Study on Supporting Unmanned Aerial Systems (UAS) Connectivity, Identification and Tracking (Release 17)", Jan. 2020, pp. 1-18.

3rd Generation Partnership Project (3GPP), TS 22.125 V17.1.0, "Technical Specification Group Services and System Aspects, Unmanned Aerial System (UAS) Support in 3GPP, Stage 1, Release 17", Dec. 2019, pp. 1-16.

3rd Generation Partnership Project (3GPP), TS 23.501 V16.1.0, "Technical Specification Group Services and System Aspects, System Architecture for the 5G System, Stage 2 (Release 16)", Jun. 2019, pp. 1-368.

3rd Generation Partnership Project (3GPP), TS 23.502 V16.1.1, "Technical Specification Group Services and System Aspects, Procedures for the 5G System, Stage 2 (Release 16)", Jun. 2019, pp. 1-495.

3rd Generation Partnership Project (3GPP), TS 33.501 V15.5.0, "Technical Specification Group Services and System Aspects, Security Architecture and Procedures for 5G System (Release 15)", Jun. 2019, pp. 1-190.

Forsberg et al., "Protocol for Carrying Authentication for Network Access (PANA)", Network Working Group, Request for Comments: 5191, Category: Standards Track, May 2008, pp. 1-46.

3rd Generation Partnership Project (3GPP), S3-201260, "Details from the SA2 UAS moderated e-mail discussion", Qualcomm Incorporated, 3GPP TSG-SA3 Meeting #99e e-meeting, May 11-15, 2020, 28 pages.

3rd Generation Partnership Project (3GPP), S3-220986, "Resolving the ENs on protection of UAS data", Qualcomm Incorporated, S3, 3GPP TSG-SA3 Meeting #107-e-meeting, May 16-20, 2022, 6 pages.

3rd Generation Partnership Project (3GPP), TS 24.501 V17.6.1, Technical Specification Group Core Network and Terminals, Non-Access-Stratum (NAS) protocol for 5G System (5GS), Stage 3, (Release 17), Mar. 2022, pp. 1-952.

3rd Generation Partnership Project (3GPP), TS 33.256 V17.0.0, Technical Specification Group Services and System Aspects, Security aspects of Uncrewed Aerial Systems (UAS) (Release 17), Mar. 2022, pp. 1-23.

* cited by examiner

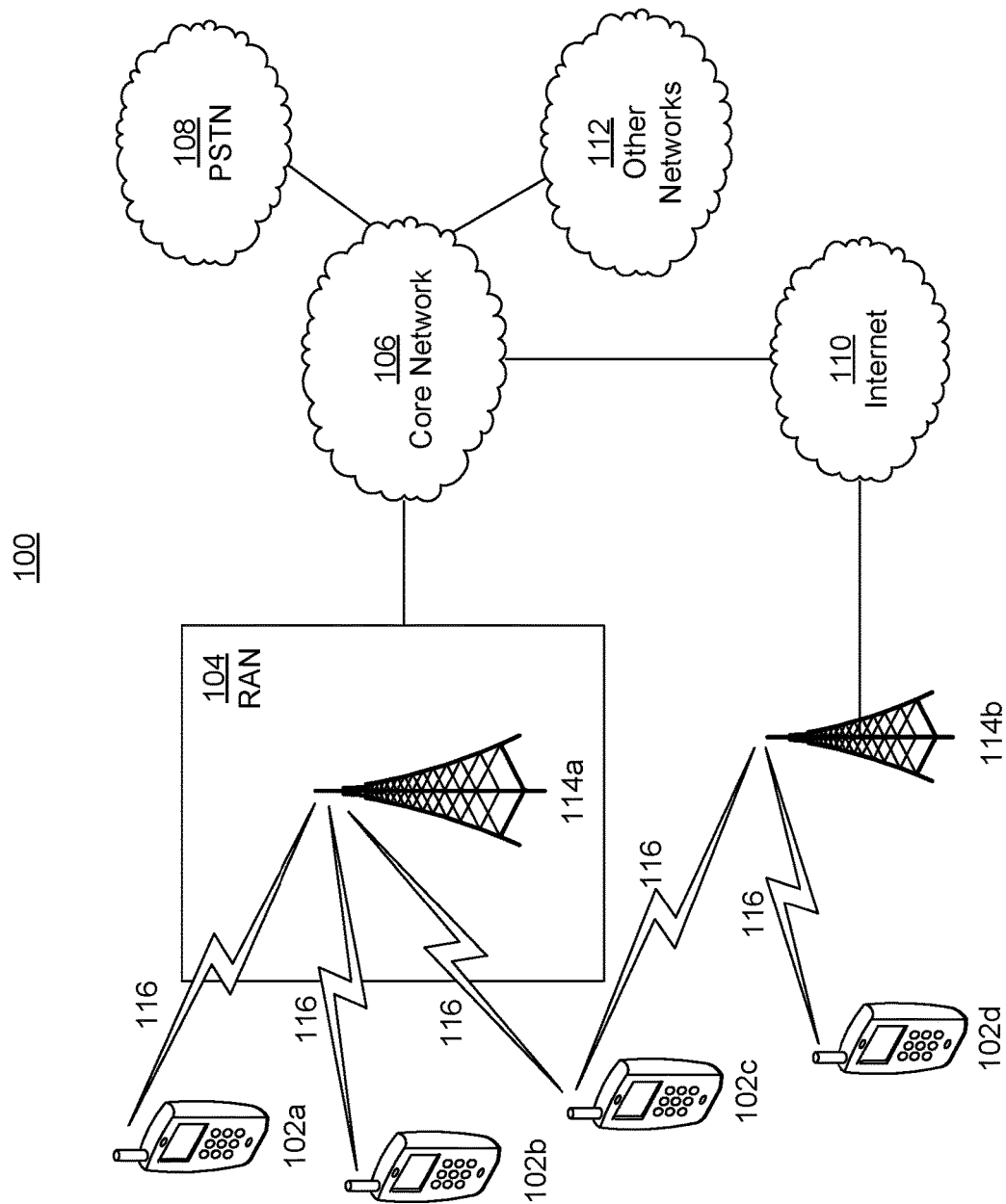

UNMANNED AERIAL VEHICLE AUTHENTICATION AND AUTHORIZATION BY UNMANNED AERIAL SYSTEM TRAFFIC MANAGEMENT OVER USER PLANE

CROSS-REFERENCE TO RELATED APPLICATIONS

This application is the National Stage Entry under 35 U.S.C. § 371 of Patent Cooperation Treaty Application No. PCT/US2021/017834, filed Feb. 12, 2021, which claims the benefit of U.S. Provisional Application No. 62/976,120, filed Feb. 13, 2020, the contents of which are incorporated by reference herein.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems and methods are described herein for an unmanned aerial vehicle (UAV) authentication and authorization by a third-party service provider (e.g., an unmanned aerial system traffic management (UTM) over a user plane (UP)). An UAV may be configured to send one or more of an UAV identifier (ID), a data network name (DNN), single network slice selection assistance information (S-NSSAI) to a network. The UAV may receive, from the network, security information that indicates an authorization of a connection to a third-party service provider. The UAV may establish, based on the security information, the connection to the third-party service provider for communications with the third-party service provider. The security information may include signature information of the third-party service provider, and one or more of a subscription identifier (ID) associated with the UAV, the UAV ID, or an ID of the third-party service provider. The UAV may send the UAV ID to the network in a request message for a communication session. The UAV may receive the security information in a response message for the communication session and establish the connection to the third-party service provider via the communication session. In an example, the security information may include a token. The token may bind the UAV ID, a generic public subscription identifier (GPSI), and the ID of the third-party service provider, and include the signature information associated with the third-party service provider. In an example, the security information may include a key bound to the UAV ID and the ID of the third-party service provider. The UAV may send an application layer message to the third-party service provider, to establish the connection to the third-party service provider using the security information.

A network device may receive a registration request from a wireless transmit/receive unit (WTRU) and determine a subscription of the WTRU to an UAV operation based on the registration request. The network device may send a subscription identifier associated with the WTRU to a third-party service provider. The network device may receive, from the third-party service provider, security information that indicates an authorization of a connection between the WTRU and the third-party service provider. The network device may send the security information to the WTRU. The security information may include one or more of signature information of the third-party service provider, a subscription ID associated with the WTRU, an UAV ID associated with the WTRU, or an ID of the third-party service provider. The network device may receive the UAV ID associated with the WTRU from the WTRU in a request message for a communication session. The network device may send the security information in a response message for the communication session. In an example, the security information may include a token. The token may bind the UAV ID associated with the WTRU, a GPSI, and the ID of the third-party service provider, and may include signature information associated with the third-party service provider. In an example, the security information may include a key bound to the UAV ID associated with the WTRU and the ID of the third-party service provider.

The third-party service provider may provide unmanned aerial system (UAS) traffic management (UTM). The third-party service provider may include an UAS service supplier (USS). The ID of the third-party service provider may include a fully qualified domain name (FQDN).

BRIEF DESCRIPTION OF THE DRAWINGS

FIG. 1A is a system diagram illustrating an example communications system in which one or more disclosed embodiments may be implemented.

DETAILED DESCRIPTION

Figure 1B:
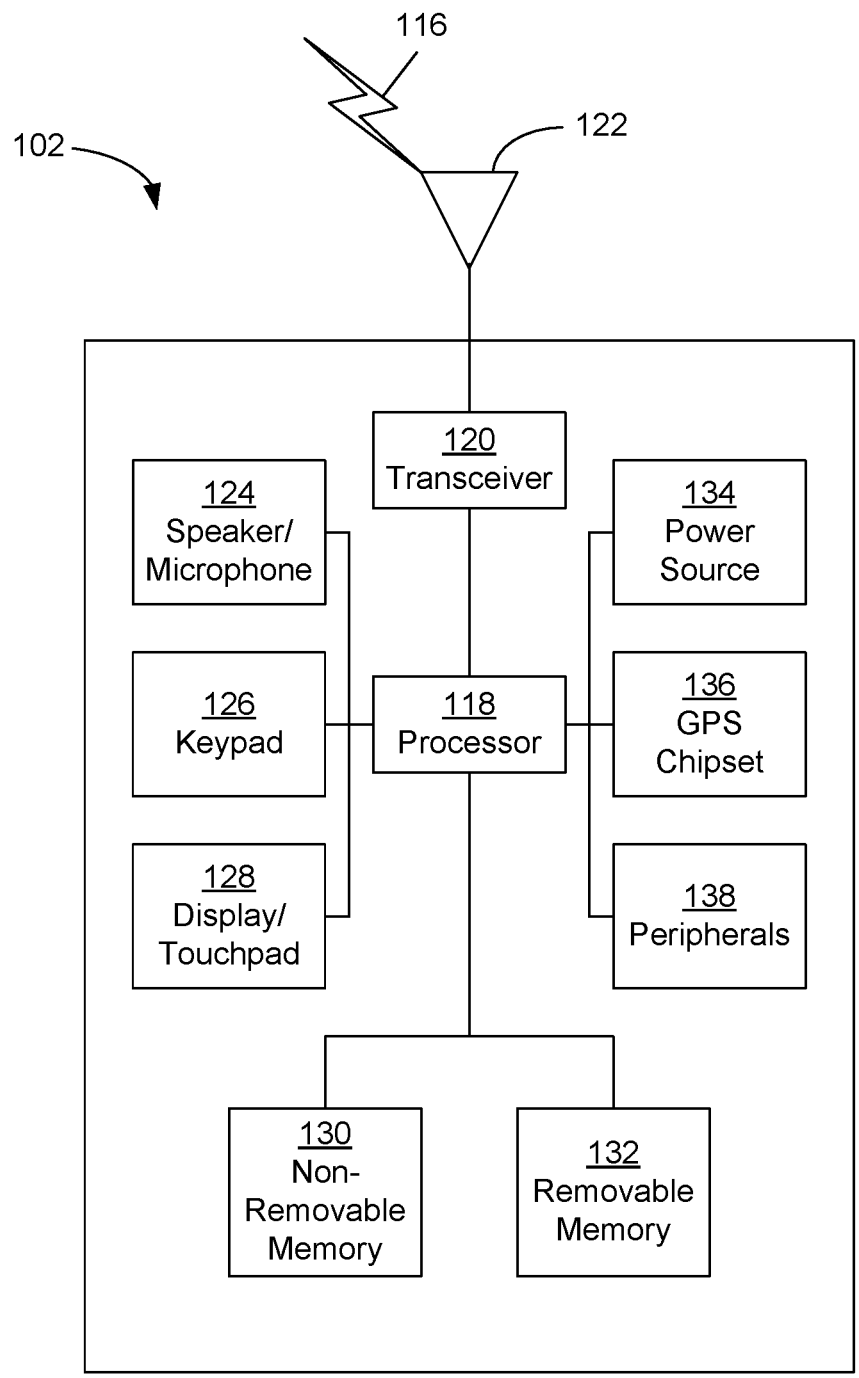
FIG. 1B is a system diagram illustrating an example wireless transmit/receive unit (WTRU) that may be used within the communications system illustrated in FIG. 1A according to an embodiment.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
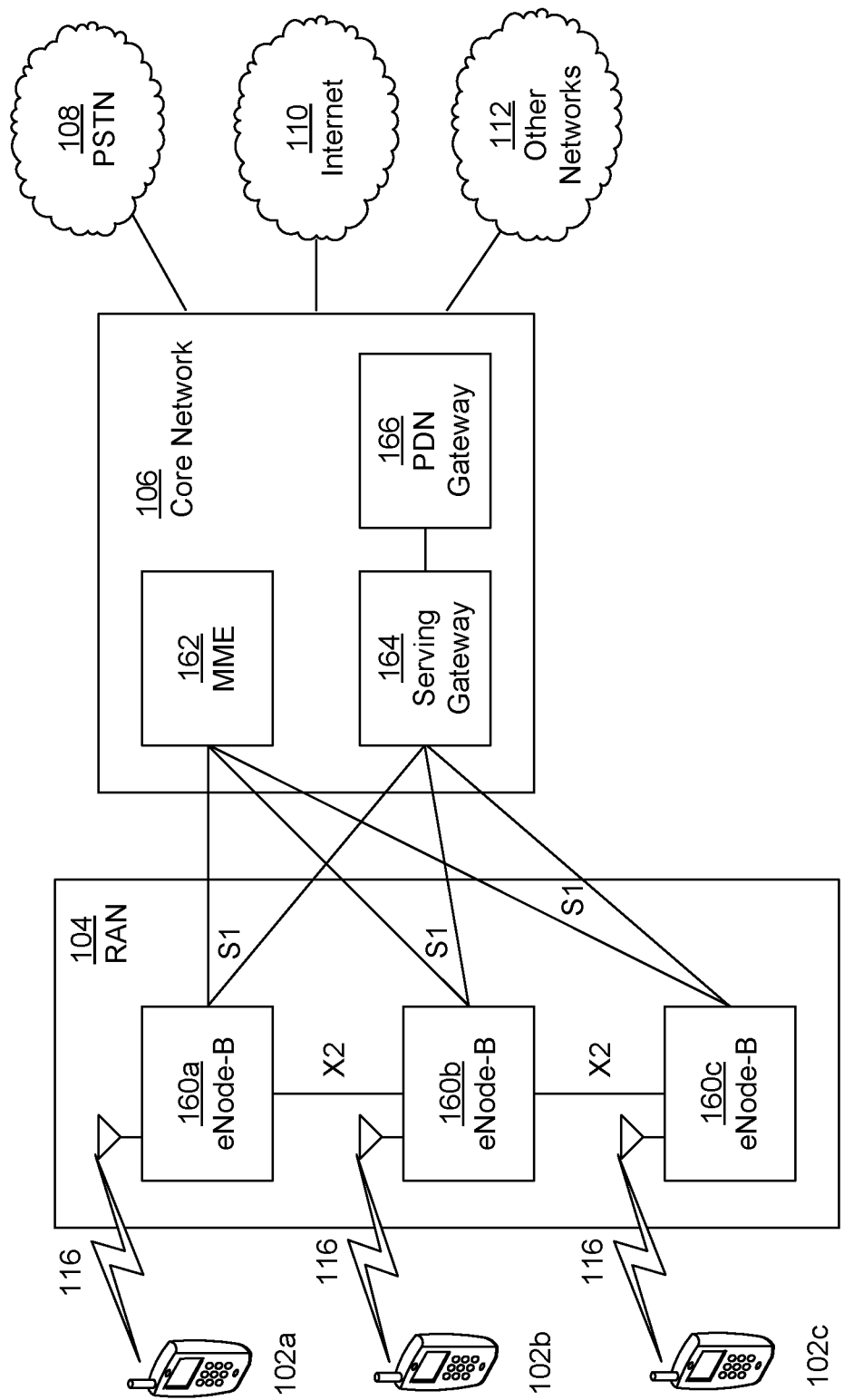
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
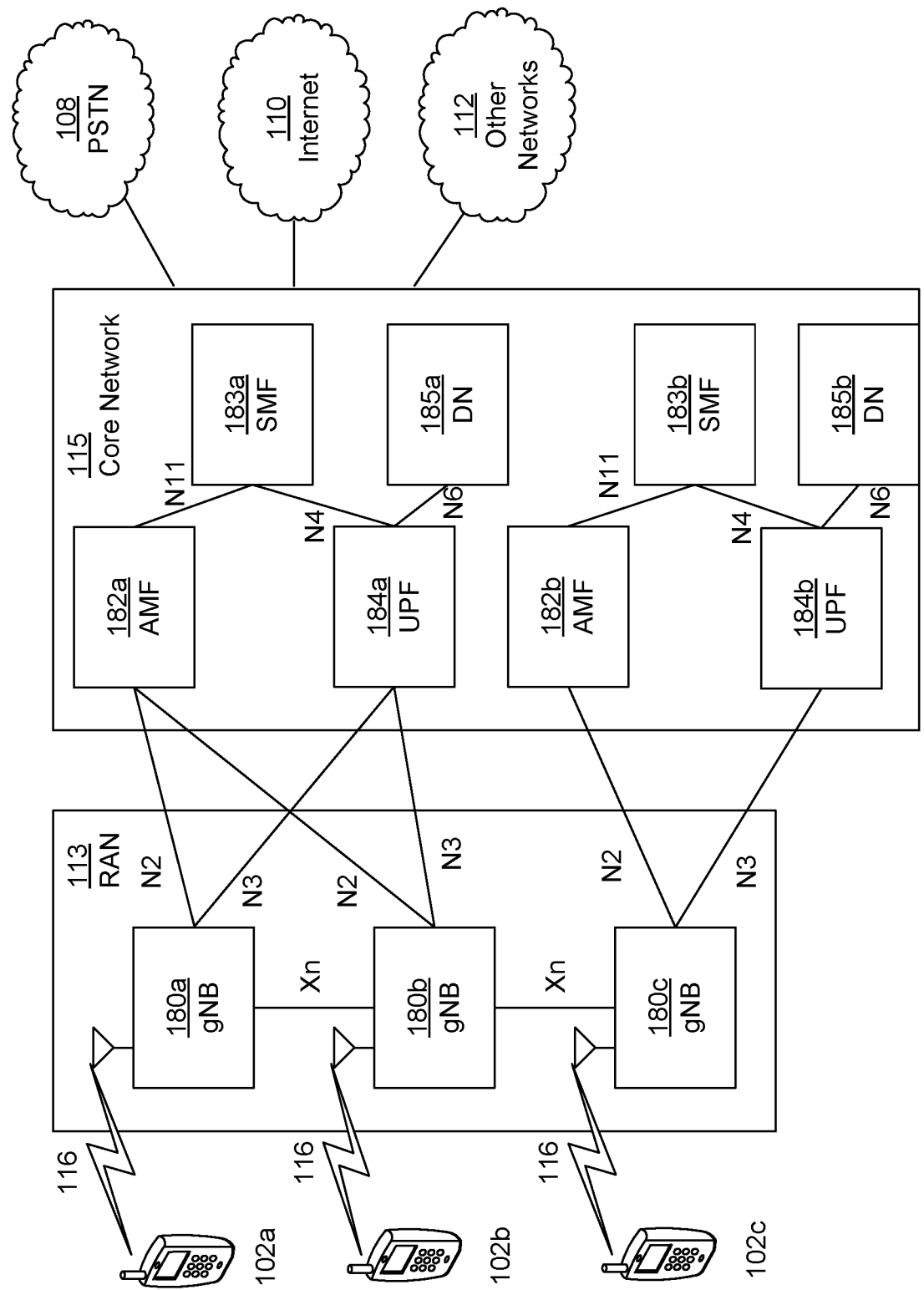
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b, in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems and methods are described herein for UAV authentication and authorization by an UTM, for example, over a user plane (UP). USS, USS/UTM or UTM, may be used interchangeably in one or more examples herein.

An UAV may be authenticated and authorized by an UTM over a UP, for example, using a key bootstrapped by the network (e.g., during a PDU session establishment procedure). For example, a WTRU may send the WTRU's UAV ID and USS/UTM DNN (e.g., in a PDU Session establishment request message). The WTRU may receive (e.g., in a PDU Session establishment accept message) a network bootstrapped key. The key may bind the WTRU identity, the UAV identity and an USS/UTM identity (e.g., domain name). The WTRU may perform authentication/authorization with the USS/UTM over UP using the network bootstrapped key (e.g., using PSK-TLS) and the UAV provisioned credentials (e.g., UAV ID, UAV certificate). An UAV may be authenticated and authorized by UTM over a UP, for example, using an UTM-generated authorization token provided by the network (e.g., during a PDU session establishment procedure). For example, a WTRU may send the WTRU's UAV ID and USS/UTM DNN (e.g., in a PDU session establishment request message). The WTRU may receive (e.g., in a PDU session establishment accept message) an UTM generated authorization token. The token may bind the WTRU identity, the UAV identity and the USS/UTM identity (e.g., domain name). The WTRU may send the UTM authorization token during authentication/authorization with the USS/UTM over UP using the UAV provisioned credentials (e.g., UAV ID, UAV certificate in an SSL handshake).

Mobile communications (e.g., 3GPP) may support, for example, one or more of remote identification and authorization, command and control (C2) communications for unmanned aerial systems (UAS), unmanned aerial vehicle (UAV) navigation by an UAV Controller (UAV-C) or by an UAS traffic management (UTM), and/or a change of UAV-C during a flight mission. A WTRU, as described herein, may be or may include an UAV. A WTRU, as described herein, may be or may include an UAV-C.

Figure 2:
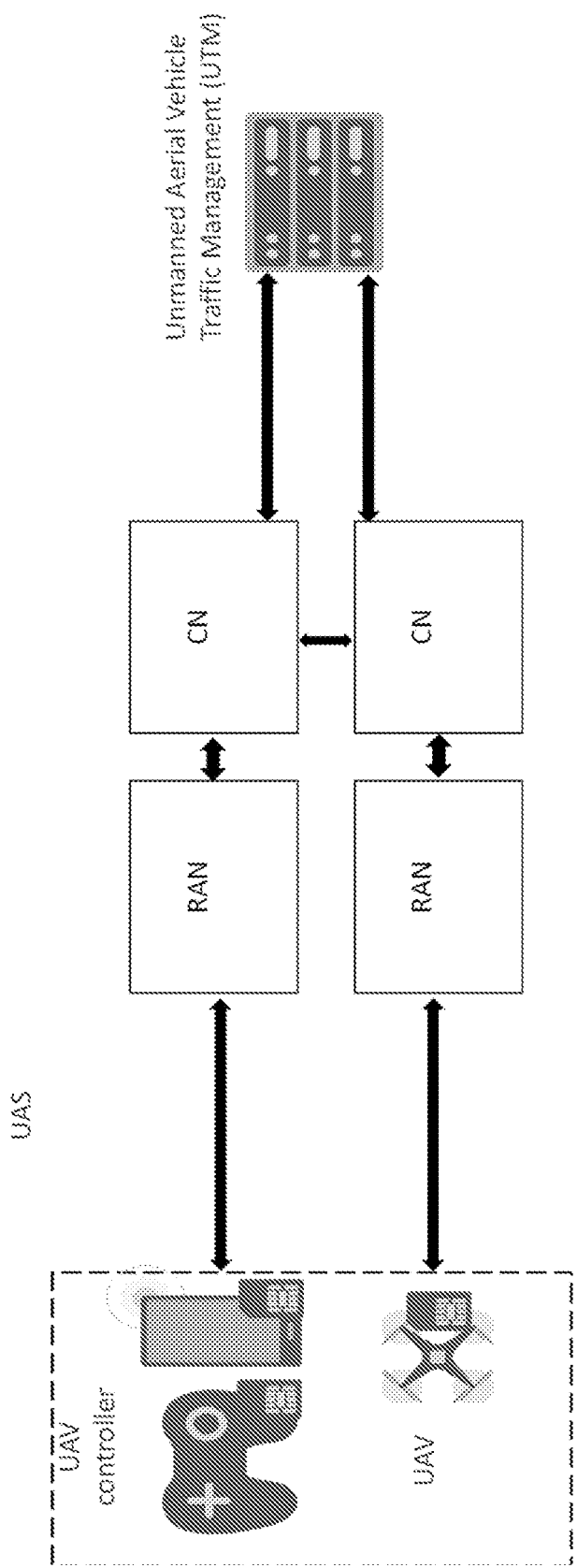
FIG. 2 illustrates an example of UAS interaction with a network and a third-party service provider (e.g., an UTM) for authorization.

FIG. 2 illustrates an example of UAS interaction with a network and a third-party service provider (e.g., an UTM) for authorization. An UAS may, for example, include one or a combination of an UAV (e.g., a drone) and an UAV-C (e.g., as illustrated by example in FIG. 2). A mobile communication system (e.g., a 3GPP, other non-3GPP system(s)) may provide communication capabilities between the UAV and UAV-C, which may communicate through the same or different radio access network (RAN) node(s) and public land mobile network(s) (PLMN(s)). The UAV and UAV-C may be connected over a mobile communication system. The UTM may provide, for example, one or more of UAS identification and tracking, authorization, enforcement, regulation of UAS operations, and/or data storage for UAS operations.

Authentication and authorization (e.g., by third-party service provider(s)) may be performed, for example, using authentication and authorization procedures (e.g., 3GPP procedures).

An authentication and authorization procedure may be network slice specific. For example, a network slice specific secondary authentication and authorization (NSSAA) (e.g., NSSAA procedure) may be performed. A WTRU may, for example, following a primary authentication, perform an NSSAA through the network (e.g., an access and mobility management function (AMF)) with a third-party authentication, authorization and accounting (AAA) server (e.g., using non-3GPP credentials), for the (e.g., all) single network slice selection assistance information (S-NSSAI) in a requested NSSAI subject to NSSAA. The network (e.g., the AMF) may determine which S-NSSAI requires an NSSAA (e.g., an NSSAA run), for example, based on one or more of WTRU capability to perform NSSAA, subscription information, and/or operator policy. Extensible authentication protocol (EAP) based authentication procedure(s) with the WTRU may be triggered, for example, following the registration procedure for the (e.g., all) applicable S-NSSAIs. The network (e.g., an AMF) may act as the authenticator in the EAP authentication between the WTRU and the third-party AAA server. A WTRU may be successfully authenticated for a given S-NSSAI. The S-NSSAI (e.g., involved in successful authentication) may be added to the allowed NSSAI in the WTRU configuration, for example, via a WTRU configuration update procedure.

Secondary authentication/authorization may be provided by a data network (DN)-AAA server, for example, during the establishment of a communication session (e.g., protocol data unit (PDU) session) procedure. A WTRU may (e.g., during the PDU session establishment procedure) send authentication/authorization information corresponding to a DN-specific identity to the network (e.g., the session management function (SMF)). The network (e.g., the SMF) may determine that authentication/authorization is to be performed or required, for example, based on an SMF policy associated with the DN. Authentication between the WTRU and DN-AAA may be performed, for example, using an EAP protocol (e.g., where the SMF may act as the authenticator). The communication session establishment procedure (e.g., the PDU session establishment procedure) may be accepted, for example, if the WTRU is successfully authenticated. The communication session establishment procedure may be rejected, for example, if the WTRU is not successfully authenticated.

Additional authentication/authorization of an UAS by a third-party service provider (e.g., an UTM) may be enabled by a mobile communication system (e.g., the 3GPP system). In some examples, authorization (e.g., a final authorization) for flight operation(s) from a third-party service provider (e.g., an UTM) may be obtained and/or enforced by a mobile communication system (e.g., the 3GPP system).

A mobile communication system may enable a mobile network operator (MNO) to allow an UAS authorization request, for example, (e.g., only) if appropriate subscription information is present. A mobile communication system may enable an UAS to send different UAS data to a third-party service provider (e.g., an UTM), for example, based on different authentication and authorization levels applied to the UAS. A mobile communication system may enable a third-party service provider (e.g., an UTM) to inform an MNO of the outcome of an authorization to operate.

An MNO may complete a first authentication and authorization (e.g., an initial authentication and authorization) of a WTRU's on-board UAV/UAV-C (e.g., based on 3GPP credentials/subscription). The MNO may enable more check(s) (e.g., secondary check(s)) by a third-party service provider such as an UTM (e.g., using non 3GPP credentials, for example, an UAV owner certificate and UAV operator certificate) for one or more of UAV/UAV-C authentication and authorization, flight plan authorization, or additional UTM services authentication and authorization (e.g., flight monitoring, collision avoidance).

Secondary checks may include, for example, one or more authentication and authorization exchanges that may be subject to national regulatory requirements. One or more secondary checks may depend on whether some service(s) (e.g., UTM service(s), for example, flight monitoring) are activated. A protocol for additional authentication and authorization may take into consideration different potential deployments for a third-party service provider (e.g., an UTM).

A protocol for an UAV authentication and authorization by a third-party service provider (e.g., an UTM) may support evolved packet system (EPS) and/or 5G system (5GS). Procedures or implementations may be provided to perform one or more of an UAV re-authentication/authorization, a revocation of authorization for an UAV, and/or UAV authentication and authorization failures.

An UAV may be equipped with a (e.g., 3GPP and/or other mobile communication system) WTRU that has UAS communication capabilities. An UAV-C communication may be enabled via a (e.g., 3GPP and/or other mobile communication system) WTRU component and/or other type of communication module (e.g., with landline communications). An UAV-C may be equipped with a (e.g., 3GPP and/or other mobile communication system) WTRU.

A WTRU ID (e.g., an international mobile subscriber identity (IMSI), or a mobile station international subscriber directory number (MSISDN)), or GPSI may identify a mobile communication system (e.g., 3GPP) capable device. A WTRU ID may be used interchangeably with an UAV WTRU ID in one or more examples herein.

An UAV ID may identify an UAV capable device (e.g., a drone). An UAV ID may be an external identifier. An UAV ID may be provided by an UAS service supplier (USS)/UTM). An UAV ID may be assigned, for example, when registered with a local authority (e.g., federal aviation administration (FAA)) or when manufactured (e.g., as a Manufacturer Serial Number, such as a PEI). An UAV ID may be provisioned. An UAV ID may be configured for (e.g., known by) the UAV device or learned by the UAV device. A UAV ID may include a central aviation Authority (CAA) level UAV ID.

An UAV WTRU ID may identify the cellular modem of an UAV (e.g., IMSI, MSISDN).

An UAS ID may identify an UAS (e.g., an UAV to UAV-C association). An UAS ID may be allocated by an UAS system (e.g., a system external to a mobile communication (e.g., 3GPP) network). A UAS ID may include a CAA level UAV ID.

Figure 3:
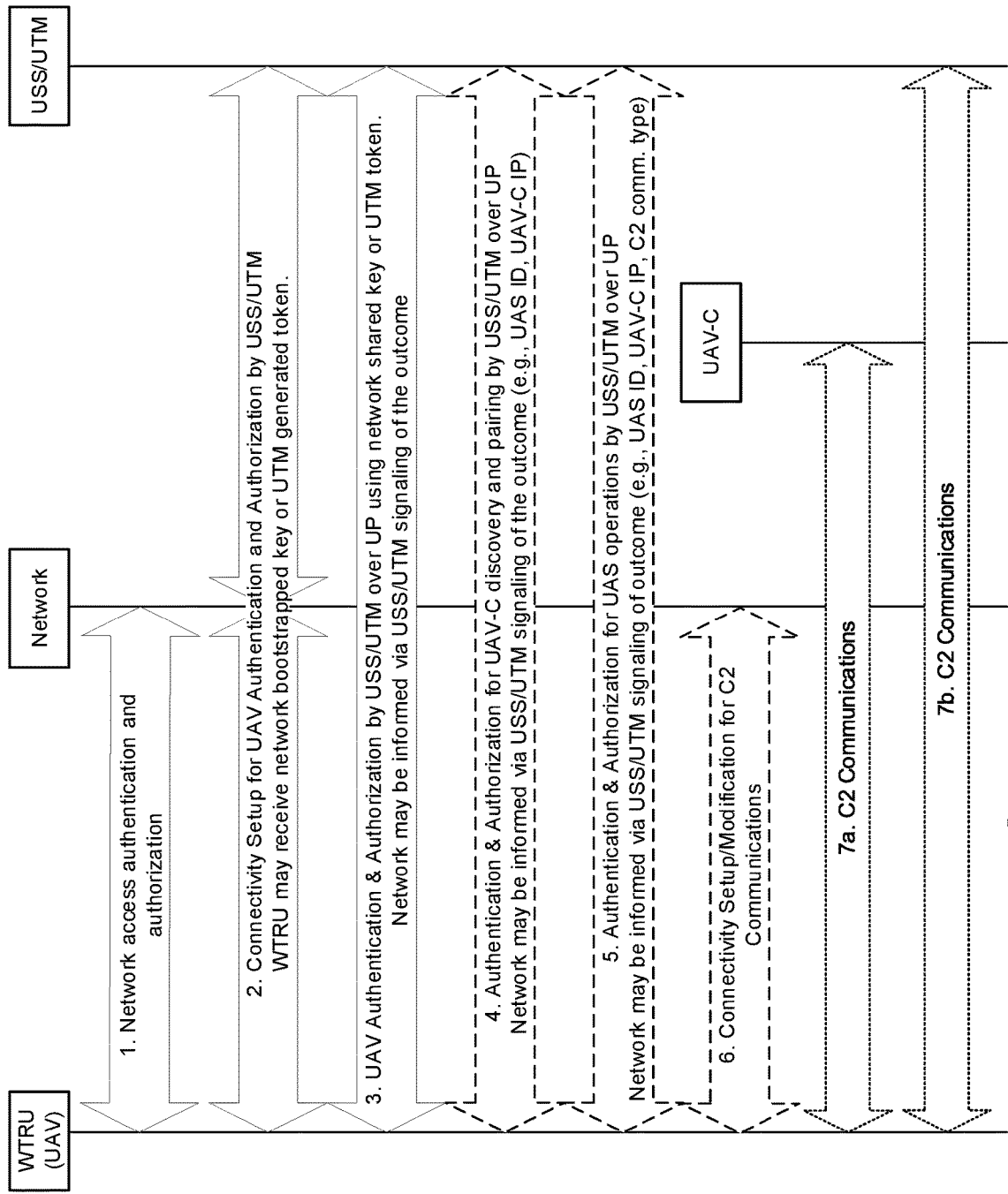
FIG. 3 illustrates example interactions and messaging for UAV authentication and authorization by a third-party service provider (e.g., an USS/UTM).

FIG. 3 illustrates example interactions and messaging for UAV authentication and authorization by a third-party service provider (e.g., an USS/UTM). The network entity may include, for example, an Evolved Universal Mobile Telecommunications System (UMTS) Terrestrial Radio Access Network (E-UTRAN) with access connected to a 5G core network (5GC) or Evolved Packet Core (EPC), or with Next Generation RAN (NG-RAN)/NR access connected to a 5GC. Access may be provided to an UAV-C (e.g., equipped with a WTRU) via non-3GPP access (e.g., WLAN) connected to 5GC or EPC.

A system (e.g., the 3GPP system) may provide key bootstrapping, for example, based on key material, such as system (e.g., 3GPP) credentials (e.g., bound to UAV and UTM identities), to the WTRU and/or a third-party service provider such as an USS/UTM (e.g., on a condition that the WTRU's subscription contains appropriate authorizations for aerial operations).

A WTRU may perform UAV authentication and authorization (e.g., via an UTM procedure over the user plane (UP)), for example, using bootstrapped key material and/or UAV provisioned credential(s). A third-party service provider (e.g., an UTM) may inform the network of the outcome of the procedure.

A successful authentication of a WTRU by the third-party service provider (e.g., the UTM) using security information (e.g., a bootstrapped key) may confirm that the WTRU on board the UAV has a valid corresponding UAV subscription (e.g., the WTRU on board the UAV is authorized by the network for aerial operations according, for example, to UAV characteristics).

A successful authentication and authorization outcome from the third-party service provider (e.g., the UTM) may indicate or confirm to the (e.g., 3GPP) network that the UAV (e.g., with on-board WTRU) is authorized to (i) obtain connectivity with the third-party service provider and/or an UAV-C and/or (ii) perform C2 communications (e.g., conditional on additional service authentication and authorization with the UTM).

The network (e.g., a 3GPP system) may provide security information (e.g., a token bound to WTRU and UAV identities) to the WTRU (e.g., on condition that the WTRU's subscription contains appropriate authorization for aerial operations). The token may be an UTM-generated token.

The WTRU may perform UAV authentication and authorization (e.g., by an UTM procedure over the user plane (UP)), for example, using the security information (e.g., a token such as an UTM authorization token) and/or credentials provisioned on the UAV. A third-party service provider (e.g., the UTM) may inform the network of the outcome of the UAV authentication and authorization (e.g., the UTM procedure over the UP).

A successful authentication of a WTRU by a third-party service provider (e.g., by an UTM using the UTM token) may confirm that the WTRU on board the UAV has a valid corresponding UAV subscription.

Connectivity for UAS service(s) may be provided by the network, for example, based on a successful authentication and authorization outcome from the third-party service provider (e.g., the UTM).

The UAV authentication and authorization (e.g., by the UTM) over the UP may succeed (e.g., the UAV/WTRU may obtain network connectivity for UAS operations based on the success), for example, if the WTRU obtains security information (e.g., valid bootstrapped key material or an UTM token as described herein). The UAV authentication and authorization (e.g., by the UTM) over the UP may fail (e.g., the UAV/WTRU may be denied network connectivity for UAS operations based on the failure), for example, if the WTRU fails to obtain the security information (e.g., valid bootstrapped key material or an UTM token).

Figure 4:
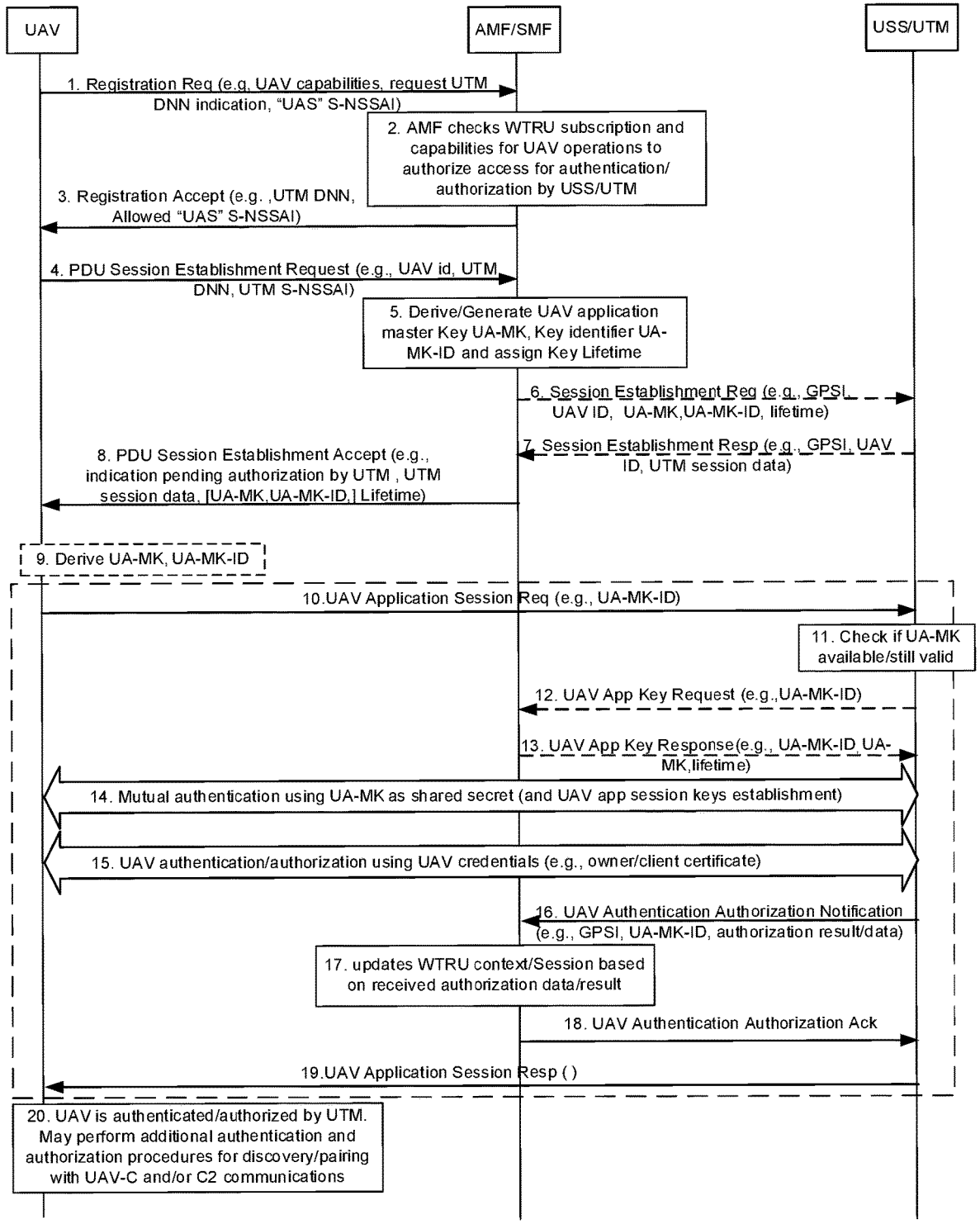
FIG. 4 illustrates example interactions and messaging for an UAV authentication and authorization by a third-party service provider (e.g., an USS/UTM) using security information (e.g., a bootstrapped key).
Figure 5:
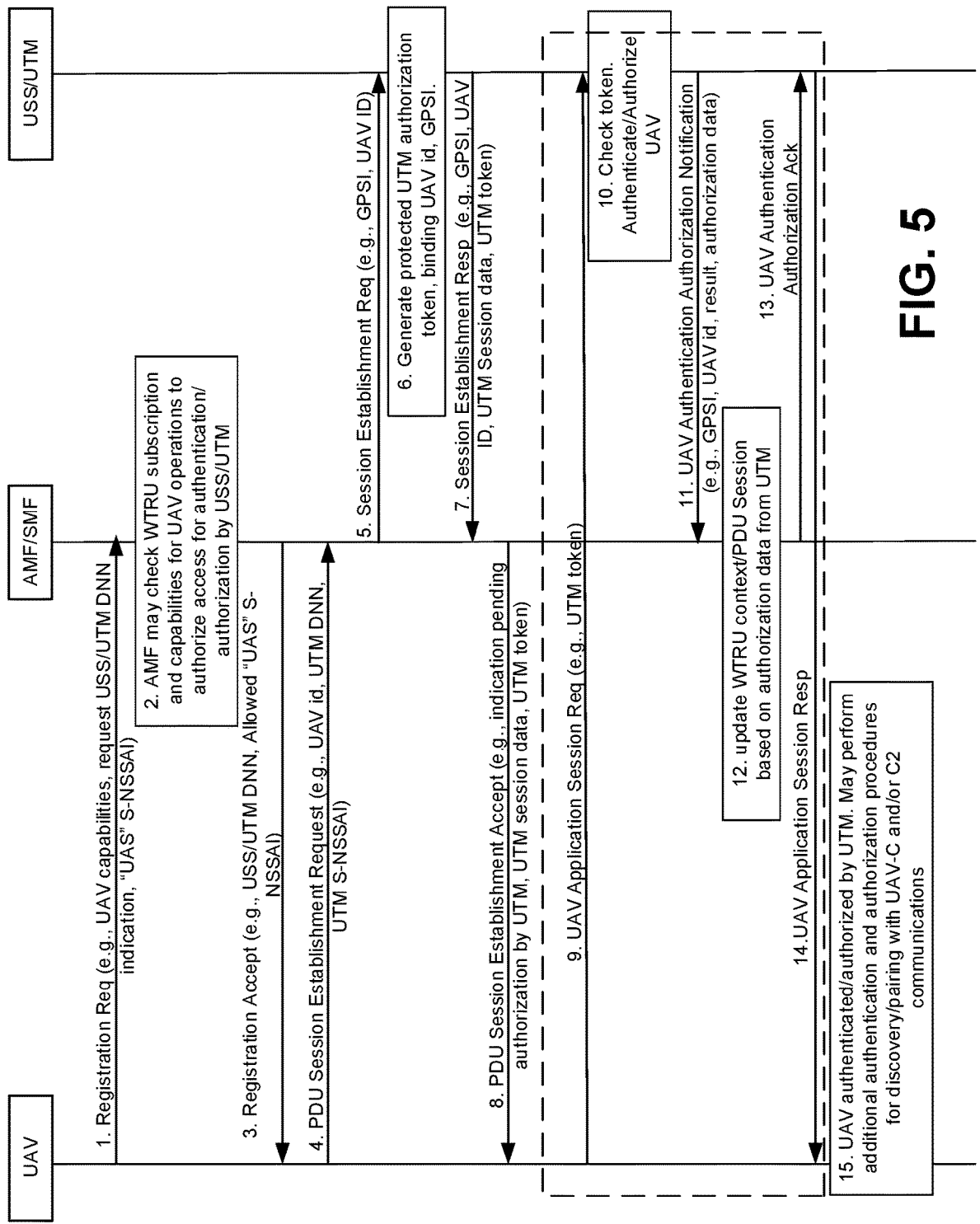
FIG. 5 illustrates example interactions and/or messaging for UAV authentication and authorization by a third-party service provider using security information such as a token (e.g., an UTM authorization token).

Referring to the figures, one or more of operations may be performed over a User Plane (UP), for example, at 3 in FIG. 3, at 10 in FIG. 4, and at 9 in FIG. 5. The third-party service provider may include one entity or multiple entities. The third-party service provider may be in a remote server. The USS and UTM are shown as co-located entities for simplicity but they may be separate in various deployment implementations. Examples provided in figures identify operations with numerals. No order of operations is required unless expressly indicated or inherently required. There is no requirement that a procedure implement all operations shown in an example. Figures present several examples of many possible example implementations, which may implement fewer, more or different operations, interactions, messaging, etc. in various orders.

FIG. 3 illustrates example interactions and messaging for an UAV authentication and authorization by a third-party service provider (e.g., an USS/UTM). As shown in FIG. 3, at 1, a WTRU (UAV) may perform a first authentication and authorization (e.g., an initial authentication and authorization procedure) for a network access. The WTRU may (e.g., during the first authentication and authorization) receive parameters (e.g., USS/UTM DNN/APN, S-NSSAI) for connectivity to a third-party service provider, for example, for establishing a connection to an USS/UTM.

As shown, at 2, a WTRU may set up connectivity (e.g., for the UAV authentication and authorization by the USS/UTM) by providing parameters, for example, parameters for USS/UTM connectivity (e.g., USS/UTM DNN/APN, S-NSSAI). The network (e.g., the SMF) may restrict communications (e.g., only) towards the third-party service provider (e.g., the USS/UTM) for the purpose of authentication/authorization messaging (e.g., until the UAV is successfully authenticated/authorized by the third-party service provider).

A WTRU may receive (e.g., from the network during a procedure, for example, a communication session establishment procedure) one or more of a bootstrapped key (e.g., a shared secret key, master key, UAV application master key (UA-MK)), a key identifier (e.g., UA-MK-ID) and/or a key lifetime. In some examples, a WTRU may obtain (e.g., perform operations locally to derive) key material (e.g., a UA-MK and UA-MK-ID), for example, based on a command/indication to do so from the network. The third-party service provider (e.g., the USS/UTM) may receive from the network key material (e.g., the one or more of the bootstrapped key, the key identifier, and/or the key lifetime) during the procedure. The network may generate security information (e.g., the bootstrapped key used for the security association WTRU-USS/UTM) based on certain credentials or particular key material, for example, by deriving a network anchor key or network access key generated based on credentials (e.g., from 3GPP long term/secret key K, or Ki, or derived from particular key material) that may be used to access the network. The network may generate security information (e.g., the bootstrapped key) based on an arbitrary parameter (e.g., a random number). A key (e.g., the bootstrapped key) may be bound to an UAV identity and an USS/UTM identity (e.g., a hostname, or a FQDN). The network may bind additional UAV subscription related parameters (e.g., one or more of or capabilities of an UAV, an UAV category value that may indicate a UAV weight and/or range characteristics, or an UAV class value that may indicate a UAV weight and/or range characteristics). In some examples, a WTRU may receive (e.g., from the network) an indication to perform a key derivation, and/or the WTRU may perform a key derivation upon receiving key material for key derivation (e.g., an USS/UTM identity, and/or a counter/nonce).

A WTRU may, in some examples, receive security information (e.g., a token, for example, an USS/UTM generated authorization token) from the network, for example, during the procedure for setting up the connectivity (e.g., a communication session herein). A third-party service provider (e.g., the USS/UTM) may generate the security information based on a WTRU identity (e.g., a GPSI) and an UAV identity, for example, by binding the WTRU identity and the UAV identity (e.g., the WTRU identity and the UAV identity may be received from the network during a communication session establishment procedure, for example, a PDU session establishment procedure). The security information (e.g., the token) may include a lifetime. The security information (e.g., the token) may be authenticated (e.g., signed by the third-party service provider, for example, to include signature information of the third-party service provider). The security information (e.g., the token) may be encrypted, for example, to preserve confidentiality of the WTRU identity and the UAV identity. The WTRU identity and/or the UAV identity may be included in the security information (e.g., the token). The security information may include an identifier of the third-party service provider (e.g., an USS/UTM identity, for example, a hostname, or a FQDN).

As shown, at 3, a WTRU may perform an application layer procedure (e.g., over the user plane) for an UAV authentication and authorization (e.g., by the third-party service provider such as an UTM).

A WTRU may send a key identifier (e.g., UA-MK-ID) to a third-party service provider (e.g., an USS/UTM) during the application layer procedure (e.g., in an initial application session establishment request). The third-party service provider may retrieve an associated UAV application master key (e.g., from a local storage) or request it from the network (e.g., by providing an UAV application master key identifier). The WTRU and the third-party service provider may use the shared UAV application master key, for example, to perform a mutual authentication and/or to obtain (e.g., to derive further) application session specific keys to secure their communications (e.g., using a PSK-TLS protocol). A WTRU may perform an UAV authentication/authorization with the third-party service provider, for example, using UAV credentials (e.g., using an UAV owner certificate over secure communications).

In some examples, a WTRU may send a token (e.g., an USS/UTM-generated authorization token) to a third-party service provider such as an USS/UTM (e.g., during the application layer procedure such as in an initial application session establishment request). The WTRU and the USS/UTM may perform a mutual authentication and/or secure their communications (e.g., using an SSL client certificate protocol) based on their provisioned credentials (e.g., respective UAV/client and UTM/server certificate).

As shown, at 3, the third-party service provider (e.g., the USS/UTM) may inform the network of the outcome of the authentication/authorization procedure (e.g., the outcome of the application layer procedure for the UAV authentication and authorization, for example, by the USS/UTM).

As shown, at 4-7, a WTRU may perform additional authentication and authorization procedures, for example, using application layer communications for discovery and/or association with an UAV-C (e.g., for UAS operations/C2 communications). The outcome at 4 may include an outcome of pairing with UAV-C. The outcome at 5 may include an outcome of flight authorization (e.g., UAS operations). A different connectivity (e.g., a new connectivity) with the network may be established or a connectivity (e.g., an existing connectivity) may be modified, for example, to enable C2 communications with the UAV-C and/or the USS/UTM. One or more UAV and UAV-C roles (e.g., as shown in FIG. 3) may be interchangeable (e.g., UAV-C equipped with WTRU).

UAV authentication and authorization may be provided by a third-party service provider such as an UTM, for example, using a bootstrapped key based on 3GPP credentials.

FIG. 4 illustrates example interactions and messaging for an UAV authentication and authorization by a third-party service provider (e.g., an USS/UTM) using security information (e.g., a bootstrapped key). In the example shown in FIG. 4, an authentication and authorization of an UAV by an USS/UTM may be performed using a bootstrapped key based on key material (e.g., 3GPP credentials), for example, in a call flow.

A WTRU may perform a bootstrapping procedure, for example, using control plane (CP) signaling with the network (e.g., a PDU session establishment procedure). A WTRU may perform bootstrapping (e.g., a bootstrapping procedure) using messaging over a user plane (UP). Bootstrapped key material may be generated based on 3GPP credentials (e.g., a long term/secret key K or Ki, for example, provisioned in a SIM card, or access key material) and/or may be bound to an UAV identity and an UTM identity.

A WTRU may perform a bound UAV/WTRU authentication/authorization using the bootstrapped key material, for example, by an USS/UTM procedure (e.g., using one or more of 10-19 shown in FIG. 4).

The example illustrated in FIG. 4 using 5GC network function (NF) (e.g., AMF and SMF) may be applicable with EPC equivalent functions (e.g., MME/PGW-C). Communications between the network and the third-party service provider (e.g., the USS/UTM) may be realized through various interfaces in an EPC or a 5GC deployment. In an example (e.g., for a 5GC implementation), an interface may be realized via a UPF (e.g., using SMF N4 Session) or a network exposure function (NEF). In EPC this interface may be realized via a policy and charging rules function (PCRF) (e.g., an Rx interface) or a bootstrapping server function (BSF).

As shown in FIG. 4, at 1, a WTRU (e.g., an UAV) may register with the network. As shown in FIG. 4, the WTRU may send a registration request to the network. The WTRU may provide, for example, in the registration request, one or more of the following parameters: UAV capabilities (e.g., one or more of UAV class/weight, beyond visual line of sight (BVLOS) flying capabilities, supported control modes, including, for example, one or more of direct stick steering, automatic flight by UTM, etc.), UAV slice information (e.g., UAV-specific slice information such as S-NSSAI including a specific slice/service type (SST) value, for example, a value of "UAS"), an indication to request third-party service provider data network name (DNN) information (e.g., USS/UTM DNN information), a subscription identifier (e.g., IMS or SUFI), and/or configuration information (e.g., UAV ID).

As shown, at 2, the network (e.g., an AMF) may check and/or determine, for example, based on subscription information associated with the WTRU (e.g., from a WTRU subscription), that a subscription to UAV operation(s) is authorized. The network (e.g., the AMF) may determine that additional UAV authentication/authorization (e.g., UAV authentication/authorization by USS/UTM) is to be performed or required.

As shown, at 3, the network (e.g., the AMF) may send a registration accept message to the WTRU. The message may include, for example, one or more of the following parameters: (a) S-NSSAI (e.g., an UAV operation specific S-NSSAI in the allowed NSSAI); and/or (b) a DNN associated with the third-party service provider (e.g., a dedicated USS/UTM DNN that may be used by the WTRU for authentication/authorization and/or establishing connectivity with an USS/UTM).

As shown, at 4, the WTRU may send a request message for a communication session (e.g., a PDU session establishment request message) that may include, for example, one or more of the following parameters: (a) an UAV ID (e.g., hardware ID, PEI) that may contain information about the third-party service provider (e.g., the USS/UTM server); (b) S-NSSAI and a DNN associated with the third-party service provider (e.g., a USS/UTM DNN and S-NSSAI, obtained as described herein or from a WTRU configuration). One or more of the parameters (e.g., S-NSSAI and/or the DNN) may indicate to the network (e.g., an SMF or AMF) to trigger the UAV authentication and authorization by the third-party service provider and for the WTRU to obtain the security information used to secure communications with the third-party service provider.

The network (e.g., a SMF) may determine an IP address of the USS/UTM, for example, based on the received UAV ID or a local configuration. The network (e.g., the SMF) may restrict communications (e.g., only) towards the IP address of the third-party service provider (e.g., the USS/UTM) for the purpose of authentication/authorization messaging (e.g., until the UAV is successfully authenticated/authorized by the third-party service provider). A WTRU may be authorized (e.g., based on a network policy) to establish other communication sessions (e.g., PDU session(s)) using different S-NSSAI/DNN for other purposes including one or more of an update of UAV software, an update of UAV configuration, or an update of UAV certificate(s)).

As shown, at 5, the network (e.g., the AMF and/or SMF) may generate or derive a UAV application master key (e.g., a new UA-MK) and/or key identifier UA-MK-ID. The key and/or the key identifier may be bound to (e.g., cryptographically bound to) an UAV ID and identifier of the third-party service provider (e.g., an USS/UTM domain). The key may be associated with (e.g., assigned) a lifetime, for example, a time during which the key may be valid before expiring, such as an expiry. A key lifetime may be determined based on a network policy. The UA-MK-ID may be generated (e.g., may be constructed to include serving network/NF routing information, for example, "random_ID@public_hostname"), for example, to enable the USS/UTM to route requests to the appropriate network/NF.

A key may be obtained based on (e.g., derived from) a network master session key (e.g., $K_{ASME}$, $K_{AMF}/K_{SEAF}$) or an anchor key ($K_{AUSF}$). An NF (e.g., a dedicated NF, for example, an authentication server function (AUSF) or a BSF) may provide a key bootstrapping service. The key bootstrapping service may be invoked, for example, by an AMF, an SMF, an NEF, etc.

In some examples, a UA-MK may be generated from a random number.

As shown, at 6, the network (e.g., the SMF) may start a different session (e.g., a new application session) with the third-party service provider (e.g., the USS/UTM), for example, to enable an authentication of the UAV (e.g., an authentication of the UAV by the UTM, for example, using network key bootstrapping). The network (e.g., the SMF) may send a session establishment request message, which may include, for example, a WTRU ID (e.g., a generic public subscription identifier (GPSI)), the UAV ID, and UAV application master key parameters (e.g., one or more of an UA-MK, an UA-MK-ID, and/or lifetime). The network (e.g., the SMF) may include a WTRU current location (e.g., if available). The network (e.g., the SMF) may include UAV subscription related parameters (e.g., one or more of authorized UAV class, mission types, and/or the like), for example, to enable UTM verification of UAV provided credentials/information.

As shown, at 7, the third-party service provider (e.g., the USS/UTM) may send a session establishment response message, which may include, for example, one or more of the following: (a) the GPSI and UAV ID; (b) UTM session data (e.g., an USS/UTM specific transaction ID (UTID), an USS/UTM fully qualified domain name (FQDN)/server IP address to be contacted by WTRU for application layer authentication and authorization procedure); and/or (c) a request to be notified of the IP address allocated for the communication session (e.g., a WTRU/PDU session).

As shown, at 8, the network (e.g., the SMF) may send a communication session (e.g., a PDU session) establishment accept message that may include, for example, one or more of the following parameters: (a) an indication of a pending authorization by the third-party service provider (e.g., indicating that the WTRU/UAV may be subject to authentication/authorization by the USS/UTM to be able to use connectivity for UAS specific operations, such as C2 communications); (b) UTM session data; (c) UAV application master key parameters (e.g., UA-MK, UA-MK-ID, lifetime). In some examples, the network (e.g., the SMF) may include key material (e.g., $K_{AMF}$, $K_{AUSF}$, nonce) and/or an indication for a WTRU to perform key derivation (e.g., from $K_{AMF}$, $K_{AUSF}$). The network (e.g., the SMF) may notify the third-party service provider of the IP address allocated to the communication session (e.g., the PDU session), for example, if requested.

As shown, at 9, the WTRU may perform derivation of UA-MK and UA-MK-ID, for example, if an indication to do so is received. The WTRU may perform a key bootstrapping procedure with a network function (e.g., BSF) over a UP (e.g., if an indication to do so is received).

As shown, at 10, the WTRU may (e.g., if an indication of a pending authorization by the third-party service provider has been received) initiate a procedure for the authentication/authorization of the UAV by the third-party service provider over a UP, for example, using an established communication session (e.g., an established PDU session) and/or an IP address of the third-party service provider (e.g., obtained from the UTM session data or from a local configuration). A WTRU may send an UAV a request message (e.g., an application session request message) that may include, for example, an UA-MK-ID and/or an UTID. The UA-MK-ID may be used as a pseudonym identity for the UAV associated with (e.g., bound to) the identity of the on-board WTRU, which may serve to protect the privacy of the UAV and WTRU permanent identities.

As shown, at 11, the third-party service provider (e.g., the USS/UTM) may obtain (e.g., retrieve) UAV application session key parameters, for example, based on the UA-MK-ID and/or the UTID. The third-party service provider may check an UA-MK validity (e.g., the UA-MK is valid if it has not expired based on a lifetime, and the UA-MK is invalid if it has expired based on the lifetime).

As shown, at 12, the third-party service provider (e.g., the USS/UTM) may request a new/different key (e.g., a new UAV application master key) from the network, for example, if a new/different key is not previously received. The third-party service provider may determine a destination (e.g., the serving network/NF destination), for example, based on routing information (e.g., routing information that may be included in an UA-MK-ID). The USS/UTM may send a request message for a key (e.g., an UAV application key request message), which may include, for example, the UA-MK-ID).

As shown, at 13, the network (e.g., the SMF) may send a response message (e.g., an UAV application key response message). The response message may include parameters, for example, the UAV application master key parameters (e.g., one or more of an UA-MK, an UA-MK-ID, or a lifetime). The network (e.g., the SMF) may include a WTRU current location (e.g., an UAV take-off location), for example, if the WTRU current location is available.

As shown, at 14, the WTRU may perform a mutual authentication (e.g., an application layer mutual authentication/key agreement protocol, for example, transport layer security pre-shared key (TLS-PSK)) with the third-party service provider, for example, using an UA-MK as a pre-shared key. UAV application session key(s) (e.g., used for end-to-end secure communications with USS/UTM) may be established, for example, based on the mutual authentication and key agreement. A successful authentication (e.g., using UA-MK) may indicate or confirm that the WTRU on board the UAV has a valid UAV subscription (e.g., that the on-board WTRU may be authorized by the network for aerial operations).

As shown, at 15, the WTRU may perform an application layer UAV authentication and authorization with the third-party service provider (e.g., the USS/UTM), for example, using UAV provisioned credentials (e.g., using one or more of an UAV ID, or an UAV owner/client certificate over the established secure communications). Separate authentication and/or key agreement protocols using an UA-MK and/or certificates (e.g., as discussed herein) may be combined into a single authentication/key agreement protocol.

As shown, at 16, the third-party service provider (e.g., the USS/UTM) may inform the network of the outcome of the UAV authentication and authorization. The third-party service provider may provide (e.g., in an UAV authentication and authorization notification message), for example, one or more of the following parameters: a WTRU ID, an UA-MK-ID, and/or authentication result/data.

As shown, at 17, the network (e.g., SMF/AMF) may update the WTRU context and/or the communication session (e.g., a PDU session), for example, based on the received authorization result/data.

As shown, at 18, the network may send a response (e.g., an UAV authentication and authorization acknowledgment) to the third-party service provider (e.g., the USS/UTM).

As shown, at 19, the third-party service provider (e.g., the USS/UTM) may send a response message (e.g., an UAV application session response message) to the WTRU, which may include the outcome of the UAV authentication/authorization procedure.

As shown, at 20, the WTRU/UAV may be authenticated/authorized by the third-party service provider (e.g., the USS/UTM). The WTRU may perform additional authentication and authorization procedures for UAS services (e.g., discovery/pairing with UAV-C and/or C2 communications).

In examples, the WTRU may perform an application layer authentication and authorization, for example, using EAP (e.g., EAP-TLS-PSK) with protocol for carrying authentication for network access (PANA) transport. A WTRU may act as the PANA client (PAC)/EAP peer, and the SMF may act as the PANA authentication agent (PAA)/EAP authenticator, reachable by WTRU via the UPF, which may act as the enforcement point (EP), and by the USS/UTM, which may act as the AAA server. The IP address of the PAA may be provided to the WTRU, for example, in a PDU session accept message or over a user plane during IP address configuration (e.g., DHCP). In an example, the WTRU may not communicate directly with the USS/UTM (e.g., MA server). The WTRU may exchange EAP messages over IP (PANA) with the PAA (e.g., SMF), which may exchange authentication and authorization messages (e.g., using DIAMETER) with the AAA (e.g., the USS/UTM). EAP/PANA authentication/authorization may be successfully completed. A session key (e.g., MSK) may be established with the AAA (e.g., via the PAA) for the WTRU to communicate securely with the USS/UTM.

An UAV authentication and authorization by UTM may be performed, for example, using an UTM authorization token.

FIG. 5 illustrates example interactions and/or messaging for UAV authentication and authorization by a third-party service provider using security information such as a token (e.g., an UTM authorization token). The example shown in FIG. 5 illustrates a call flow for an authentication and authorization of an UAV by a third-party service provider using a token (e.g., an UTM authorization token). The third-party service provider may be a provider that provides UTM. The third-party service provider may include an USS.

A WTRU may obtain security information (e.g., an UTM authorization token) from a third-party service provider (e.g., an USS/UTM), for example, using control plane signaling with the network (e.g., a PDU session establishment procedure).

The WTRU may establish a connection to the third-party service provider for communications with the third-party service provider. As shown in FIG. 5, the connection may be between the third-party service provider and the WTRU. The WTRU may perform a bound UAV/WTRU authentication/authorization by the third-party service provider (e.g., one or more of 9-14 shown in the dotted rectangle area in FIG. 5) using the security information (e.g., an UTM authorization token).

As shown in FIG. 5, at 1, a WTRU (e.g., an UAV) may register with the network. As shown in FIG. 5, the WTRU may send a registration request to the network. The WTRU may provide, for example, in the registration request, one or more of the following parameters: UAV capabilities (e.g., one or more of UAV class/weight, beyond visual line of sight (BVLOS) flying capabilities, supported control modes, including, for example, one or more of direct stick steering, automatic flight by UTM, etc.), UAV slice information (e.g., UAV-specific slice information such as S-NSSAI including a specific slice/service type (SST) value, for example, a value of "UAS"), an indication to request third-party service provider data network name (DNN) information (e.g., USS/UTM DNN information), a subscription identifier (e.g., IMS or SUPI), and/or configuration information (e.g., UAV ID).

As shown, at 2, the network (e.g., an AMF) may check and/or determine, for example, based on subscription information associated with the WTRU (e.g., from a WTRU subscription), that a subscription to UAV operation(s) is authorized. The network (e.g., the AMF) may determine that additional UAV authentication/authorization (e.g., UAV authentication/authorization by USS/UTM) is to be performed or required.

As shown, at 3, the network (e.g., the AMF) may send a registration accept message to the WTRU. The message may include, for example, one or more of the following parameters: (a) S-NSSAI (e.g., an UAV operation specific S-NS-SAI in the allowed NSSAI); and/or (b) a DNN associated with the third-party service provider (e.g., a dedicated USS/UTM DNN that may be used by the WTRU for authentication/authorization and/or establishing connectivity with an USS/UTM).

As shown, at 4, the WTRU may send a request message for a communication session (e.g., a PDU session establishment request message) that may include, for example, one or more of the following parameters: (a) an UAV ID (e.g., hardware ID, PEI) that may contain information about the third-party service provider (e.g., the USS/UTM server); (b) S-NSSAI and a DNN associated with the third-party service provider (e.g., a USS/UTM DNN and S-NSSAI, obtained as described herein or from a WTRU configuration). One or more of the parameters (e.g., S-NSSAI and/or the DNN) may indicate to the network (e.g., an SMF or AMF) to trigger the UAV authentication and authorization by the third-party service provider and for the WTRU to obtain the security information used to secure communications with the third-party service provider.

As shown, at 5, the network (e.g., the SMF) may initiate a session with the third-party service provider (e.g., start a new session with the USS/UTM), for example, to enable authentication of the UAV by UTM using security information (e.g., the UTM token) over UP. The network (e.g., the SMF) may send a request message for a communication session (e.g., a session establishment request message) that may include, for example, a WTRU ID (e.g., a subscription ID such as a GPSI) and/or an UAV ID, to the third-party service provider.

As shown, at 6, the third-party service provider (e.g., the USS/UTM) may generate security information (e.g., a protected authorization token signed, and/or encrypted using, for example, JSON web token (JWT) or JSON web encryption (JWE)). The security information may be signed by the third-party service provider (e.g., include signature information of the third-party service provider). The security information may include (e.g., cryptographically binds), for example, the GPSI, the UAV ID, an ID of the third-party service provider, and/or a lifetime. The lifetime may include a lifetime associated with the security information.

As shown, at 7, the third-party service provider (e.g., the USS/UTM) may send a response message for the communication session (e.g., a session establishment response message), which may include the security information (e.g., the UTM authorization token) that indicates an authorization of a connection to the third-party service provider and binds the GPSI, the UAV ID, and the ID of the third-party service provider. The message may include, for example, UTM session data and a request for a WTRU IP address (e.g., as previously described).

As shown, at 8, the network (e.g., the SMF) may send a response message for a communication session (e.g., a PDU session establishment accept message). The response message may include, for example, one or more of the following parameters: (i) an indication of a pending authorization by the third-party service provider (e.g., the UTM) and/or data (e.g., UTM session data as previously described); and/or (ii) security information (e.g., an UTM authorization token) that may indicate an authorization of a connection to the third-party service provider. The network (e.g., the SMF) may notify the third-party service provider (e.g., the USS/UTM) of the IP address allocated to the communication session (e.g., a PDU session), for example, if the IP address allocated to the communication session is requested.

As shown in 9-14 in FIG. 5, the WTRU may establish a connection to the third-party service provider (e.g., the USS/UTM) based on the received security information, for communications (e.g., secure communications) with the third-party service provider. As shown in FIG. 5, at 9, the WTRU may initiate an authentication/authorization of the UAV by the third-party service provider (e.g., a procedure for authentication/authorization of the UAV by USS/UTM over the UP), for example, using an established communication session (e.g., an established PDU session) and an IP address of the third-party service provider (e.g., from the UTM session data or from a local configuration).

The WTRU may perform a mutual authentication with the third-party service provider (e.g., the USS/UTM), for example, by presenting a certificate (e.g., UAV owner certificate, an SSL client certificate) to the third-party service provider. The WTRU may establish a connection to the third-party service provider for communications with the third-party service provider. The WTRU and the third-party service provider may exchange multiple application layer messages (e.g., during an SSL handshake), for example, to establish a secure connection over HTTP transport.

The WTRU (e.g., during the exchange) may provide, for example, one or more of the following parameters: the UAV ID, UAV credentials (e.g., owner certificate), the security information (e.g., an UTM authorization token), UAV takeoff weight, a mission type, etc. For example, as shown in FIG. 5, at 9, the WTRU may send the security information (e.g., an UTM authorization token) to the third-party service provider in a request message for an UAV application session. Some parameters (e.g., WTRU/UAV identifier(s) and/or an UTM authorization token) may be sent after the secure connection is established, for example, to preserve the integrity and confidentiality of the parameters (e.g., independent of radio layer protection of user data, for privacy protection of the UAV).

As shown, at 10, the third-party service provider (e.g., the USS/UTM) may authenticate the UAV and/or may evaluate the validity of the security information (e.g., the UTM authorization token). The third-party service provider may determine or confirm that the on-board WTRU has an UAV subscription (e.g., confirming that the on-board WTRU is authorized by the network for aerial operations), for example, based on the authentication of the UAV and/or the evaluation of the validity of the security information.

As shown, at 11, the third-party service provider (e.g., the USS/UTM) may inform the network of the outcome of the UAV authentication and authorization procedure, for example, by providing, in an UAV authentication and authorization notification message, one or more of the following parameters: the WTRU ID, the UAV ID, and/or authentication result/data. As shown, at 12, the network (e.g., SMF/AMF) may update the WTRU context and/or the communication session (e.g., the PDU session), for example, based on the received authorization result/data. At 13, the network may send an UAV authentication and authorization acknowledgment to the third-party service provider. At 14, the USS/UTM may send the WTRU a response message for the UAV application session, which may include the outcome of the UAV authentication/authorization procedure. The response message may include, for example, a different token (e.g., a new authorization token) and an address (e.g., URL), which may be used for authentication and authorization of USS/UTM services. As shown, at 15, the WTRU may perform additional authentication and authorization procedures for UAS services (e.g., discovery/pairing with UAV-C and/or C2 communications). The WTRU/UAV may be authenticated/authorized by the third-party service provider (e.g., the USS/UTM).

Authentication and authorization procedures may be performed for UAV/UAV-C discovery and association, and C2 Communications.

Figure 6:
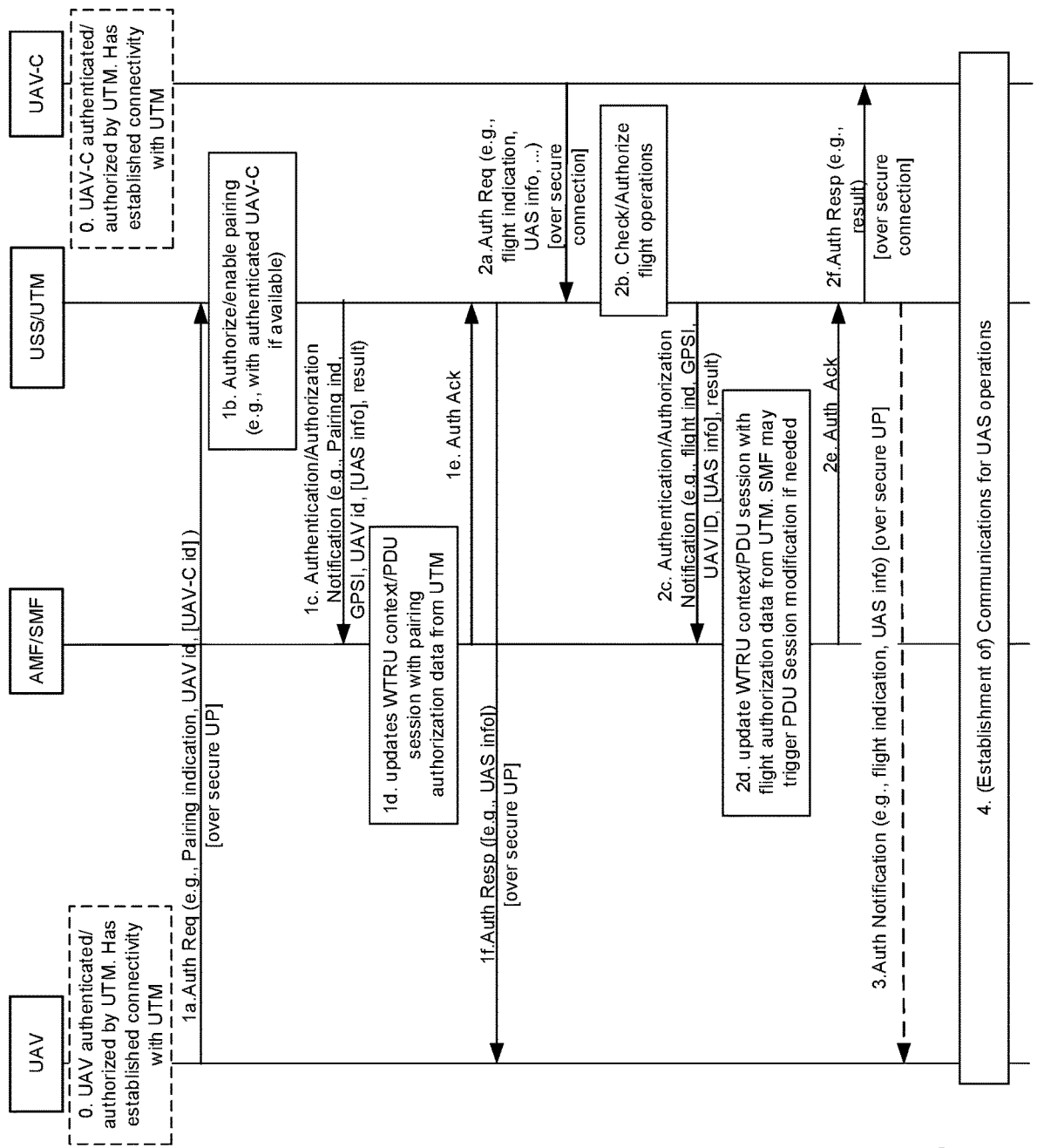
FIG. 6 illustrates example interactions and messaging for an UAV authorization by a third-party service provider (e.g., an USS/UTM) for additional services (e.g., UTM services).

FIG. 6 illustrates example interactions and messaging for an UAV authorization by a third-party service provider (e.g., an USS/UTM) for additional services (e.g., UTM services). The example shown in FIG. 6 illustrates a UP-based procedure for additional UTM services, for example, one or more of UAV-C discovery/association, flight operations authorization, or the like.

Example operations (e.g., example call flow steps) shown in FIG. 6 may be invoked, for example, after a successful authentication and authorization of an UAV by an USS/UTM (e.g., as illustrated in one or more examples herein). For example, if the UAV operational status is acceptable (e.g., acceptable UAV battery level, up-to-date software, configuration and maps installed, etc.), the application layer on the UAV may trigger the next steps. The steps may be performed, for example, using the same secure application layer session (e.g., same HTTPs session) or a different session, for example, after re-authenticating (e.g., using a bootstrapped key material as described in one or more examples herein). The UAV may be controlled, for example, by an UAV-C that may be connected via a system (e.g., via a 3GPP system such as E-UTRAN, NG-RAN, WLAN or other connection(s)).

As shown in FIG. 6, at 0, the UAV and UAV-C may have been authenticated/authorized successfully (e.g., by the USS/UTM). At 1, the WTRU may perform the authentication/authorization procedure for the UAV to UAV-C pairing, for example, by the USS/UTM over the user plane (e.g., with application layer messages).

As shown, at 1a, the WTRU may send an authentication/authorization message to the USS/UTM. The message may indicate a request for discovery or pairing/association with a specific or potential UAV-C. The message from the WTRU may include matching/filtering information for a desired UAV-C. The matching information may include, for example, one or more of the following elements: (i) a specific UAV-C ID (e.g., a hardware ID and/or an UAV-C IP address); (ii) an UAV pilot identity and/or an UAV operator identity; (iii) a wildcard element (e.g., empty UAV-C information), for example, to enable an association with the UAV-C(s) authorized to be paired with the UAV (e.g., authorize pairing with any UAV-C that presents same owner certificate and/or that requested the specific UAV).

As shown, at 1b, the USS/UTM may authorize/enable pairing of an UAV with an UAV-C, for example, based on the UAV-C matching information provided. The USS/UTM may search for an active UAV-C session data record that, for example, (i) is available for pairing and (ii) matches the UAV pairing criteria. The USS/UTM may allocate an UAS ID (e.g., a new UAS ID associating the UAV with the UAV-C), for example, if an UAV-C session data record is found. The USS/UTM may store the UAS ID (e.g., the new UAS ID), for example, in session data for the UAV and session data for the UAV-C. The USS/UTM may link the UAV and UAV-C session data records together.

As shown, at 1c, the USS/UTM may send an authentication/authorization notification message to the SMF. The message may indicate the result of discovery/pairing. The message may include, for example, the WTRU ID, the UAV ID and UAS information, for example, if an UAV-C was discovered/paired. The UAS information may include, for example, one or more of the UAS ID, the UAV-C ID, and/or the UAV-C IP address.

As shown, at 1*d*, the SMF may update WTRU authorization data with UAV pairing authorization data from the USS/UTM. As shown, at 1*e*, the SMF may send an acknowledgment back to the USS/UTM. As shown, at 1*f*, the USS/UTM may send the authentication/authorization for the discovery/pairing result to the WTRU, for example, over the user plane (e.g., including the UAS information, if available).

As shown, at 2, the UAV-C may perform the authentication/authorization procedure (e.g., for UAS flight/operations) by the USS/UTM over the user plane (e.g., with application layer messages).

As shown, at 2*a*-2*b*, the USS/UTM may authenticate/authorize the UAV-C for flight operations, for example, based on UAV-C provided data (e.g., flight plan, pilot credentials, etc.). As shown, at 2*c*, the USS/UTM may provide the SMF with an outcome of the authorization for the UAV to perform UAS operations. The SMF may update the WTRU authorization data with the UAS operation authorization data from the USS/UTM (e.g., allowing communications to and from the UAV-C provided IP address). At 2*d*, the SMF may trigger a PDU session modification procedure. As shown, at 2*e*, the SMF may send an acknowledgment back to the USS/UTM. At 2*f*, the USS/UTM may send the authentication/authorization outcome for the discovery/pairing to the UAV-C, for example, over the user plane (e.g., including UAS information, if available).

As shown, at 3, the USS/UTM may send the authentication/authorization for UAS flight/operations to the WTRU, for example, over the user plane (e.g., including UAS information, if available). As shown, at 4, the UAV may be authorized to communicate with the UAV-C and/or the UTM for UAS flight/operations.

UAV re-authentication, authorization revocation and authentication/authorization failure handling may be performed.

Figure 7:
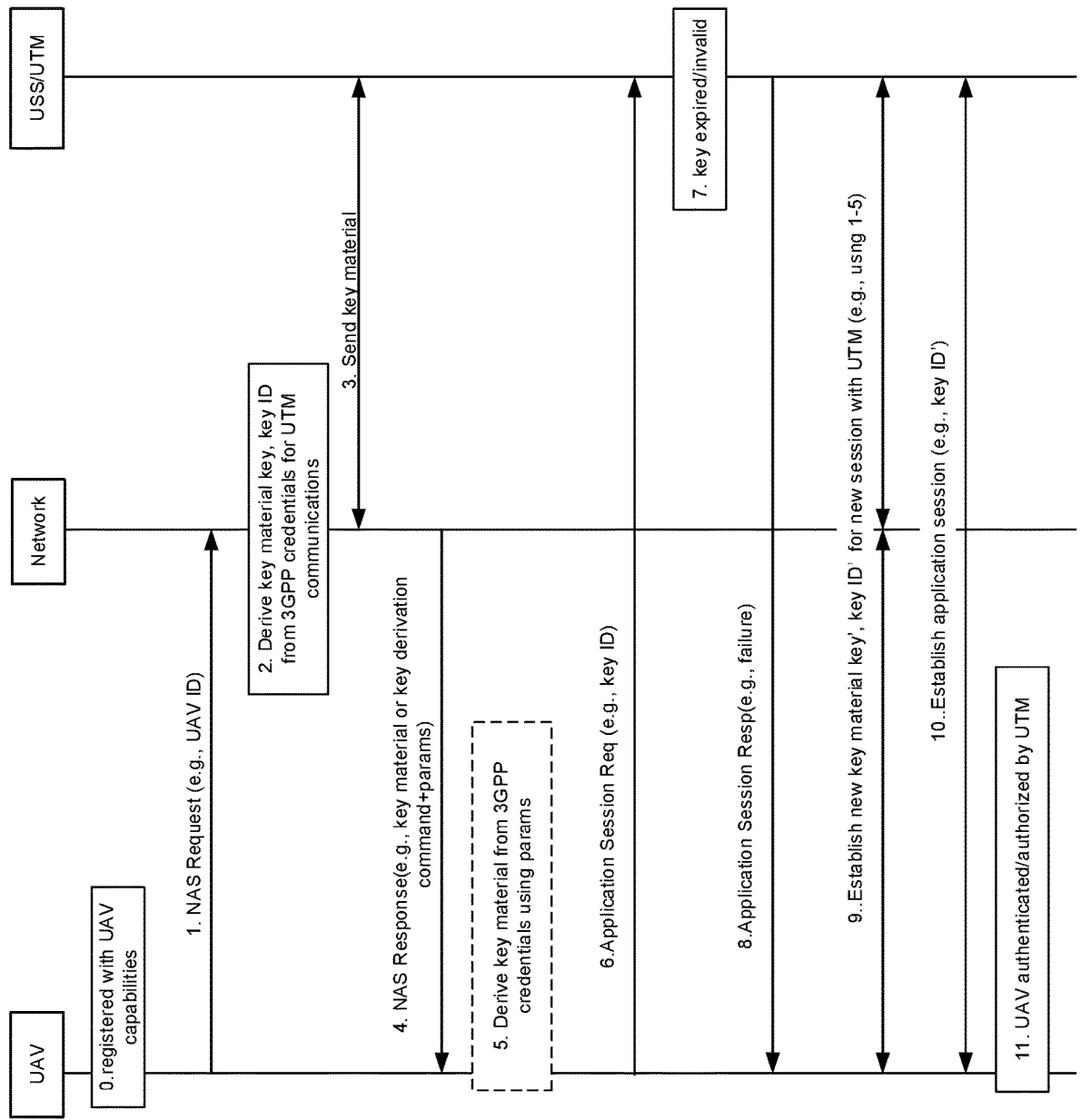
FIG. 7 illustrates example interactions and messaging for an UAV authorization by a third-party service provider (e.g., an USS/UTM) with failure handling for an expired or invalid key.

FIG. 7 illustrates example interactions and messaging for an UAV authorization by a third-party service provider (e.g., an USS/UTM) with failure handling for an expired or invalid key. FIG. 7 illustrates an example scenario where the UAV authentication and authorization by the UTM fails (e.g., when a bootstrapped key material is invalid or expired, or the UTM fails to obtain fresh or different bootstrapped key material from the network).

As shown in FIG. 7, at 0, a WTRU may be registered as UAV capable and authorized for a network access, for example, authorized for aerial operations based on UAV subscription authorization.

As shown, at 1-5, a WTRU may establish key material (e.g., a key or a key ID) derived from 3GPP credentials, for example, to use in communications with the third-party service provider (e.g., the USS/UTM) during a NAS procedure and/or over UP (e.g., as described in one or more examples herein). At 6, the WTRU may send a request message (e.g., a new application session request message) to the third-party service provider (e.g., including a key ID). At 7, the third-party service provider may detect that the corresponding key is invalid or has expired or the third-party service provider fails to obtain a different key (e.g., a fresh key) from the network. At 8, the WTRU may receive a response message (e.g., an application session response message) indicating a failure. At 9, the WTRU may establish different key material (e.g., new key material such as key', key ID') derived from 3GPP credentials. The WTRU may implement a procedure similar to operations shown in 1-5. Network resources previously allocated (e.g., the PDU session) may be released or re-used during this procedure. At 10, the WTRU may establish successfully a different application session (e.g., a new application session with the UTM) using the different key material (e.g., key', key ID'). The network may be informed (e.g., by the UTM) of the successful outcome. At 11, the UAV may be authenticated and authorized by the third-party service provider.

Figure 8:
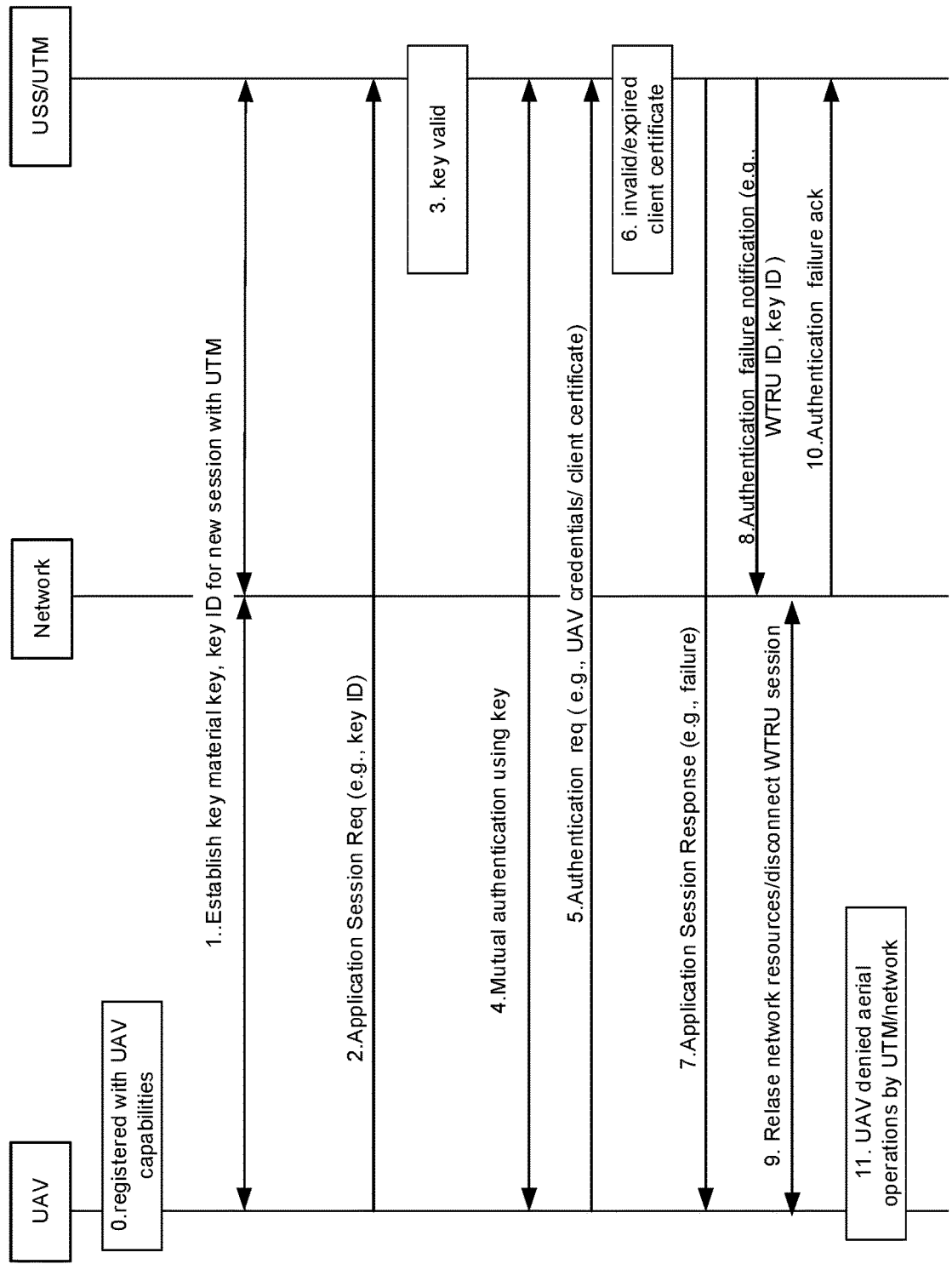
FIG. 8 illustrates example interactions and messaging for an UAV authorization by a third-party service provider (e.g., an USS/UTM) with failure handling for an expired or invalid certificate.

FIG. 8 illustrates example interactions and messaging for an UAV authorization by a third-party service provider (e.g., an USS/UTM) with failure handling for an expired or invalid certificate. FIG. 8 illustrates an example scenario where the UAV authentication and authorization by the third-party service provider fails (e.g., due to an UAV certificate being invalid or expired).

As shown in FIG. 8, at 0, the WTRU may be registered as UAV capable and authorized for a network access (e.g., a regular network access), for example, based on UAV subscription authorization.

As shown, at 1, the WTRU may establish key material (e.g., key, key ID) derived from 3GPP credentials, for example, to use in communications with the third-party service provider (e.g., during a NAS procedure as described in one or more examples herein). As shown, at 2, the WTRU may send an application session request message to the third-party service provider (e.g., including a key ID). At 3, the third-party service provider may evaluate whether the corresponding key is valid. As shown, at 4, the WTRU may perform a mutual authentication with the third-party service provider (e.g., using the key). As shown, at 5, the WTRU may initiate an UAV authentication, for example, by sending the UAV credentials (e.g., client certificate in an SSL exchange). As shown, at 6, the third-party service provider may detect that the UAV credentials are invalid/expired. The WTRU may receive an appropriate authentication failure message. At 7, the WTRU may receive an application session response message indicating a failure. At 8, the third-party service provider may send an authentication/authorization notification failure message to the network. The message may include, for example, a WTRU ID and a key ID. As shown, at 9, the network may perform or initiate a procedure to release the network resources used for connectivity with the third-party service provider. As shown, at 10, the network may acknowledge receipt of the authentication failure from the third-party service provider. At 11, the UAV may not be authorized for aerial operations by the network/third-party service provider. The UAV may be (e.g., subsequently) authorized for aerial operations, for example, by successfully completing the procedure with valid UAV credentials (e.g., following an update of such credentials).

A method, process, apparatus, medium storing instructions, medium storing data, or signal may be described herein according to, but not limited to one or more of the following: sending an UAV ID to a network; receiving, from the network, security information that indicates an authorization of a connection to a third-party service provider; establishing, based on the security information, the connection to the third-party service provider for communications with the third-party service provider; the security information comprising signature information of the third-party service provider; the security information comprising at least one of a subscription ID associated with the UAV, the UAV ID, or an ID of the third-party service provider; sending the UAV ID to the network in a request message for a communication session; receiving the security information in a response message for the communication session; establishing the connection to the third-party service provider via the communication session; the security information comprising a token; the token binding the UAV ID, a GPSI, and the ID of the third-party service provider and comprising signature information associated with the third-party service provider; the security information comprising a key bound to the UAV ID and the ID of the third-party service provider; sending an application layer message to the third-party service provider, to establish the connection to the third-party service provider using the security information.

A method, process, apparatus, medium storing instructions, medium storing data, or signal may be described herein according to, but not limited to one or more of the following: receiving a registration request from a WTRU; determining a subscription of the WTRU to an UAV operation based on the registration request; sending a subscription identifier associated with the WTRU to a third-party service provider; receiving, from the third-party service provider, security information that indicates an authorization of a connection between the WTRU and the third-party service provider; sending the security information to the WTRU; the security information comprising at least one of signature information of the third-party service provider, a subscription ID associated with the WTRU, an UAV ID associated with the WTRU, or an ID of the third-party service provider; receiving the UAV ID associated with the WTRU from the WTRU in a request message for a communication session; sending the security information in a response message for the communication session; the security information comprising a token; the token binding an UAV ID associated with the WTRU, a GPSI, and the ID of the third-party service provider and comprising signature information associated with the third-party service provider; the security information comprising a key bound to the UAV ID associated with the WTRU and the ID of the third-party service provider; the third-party service provider providing unmanned aerial system (UAS) traffic management; the third-party service provider comprising an unmanned aerial system (UAS) service supplier; the ID of the third-party service provider comprising a fully qualified domain name (FQDN).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit associated with an unmanned aerial vehicle (UAV), the WTRU comprising:
a processor, wherein the processor is configured to:
  send a UAV identifier (ID) to a network;
  receive, from the network, security key information associated with the UAV ID, wherein the security key information indicates an authorization of a connection to a third-party service provider; and
  establish, based on the security key information, the connection to the third-party service provider to communicate with the third-party service provider.

2. The UAV WTRU of claim 1, wherein the security key information is received via a protocol data unit (PDU) session establishment procedure.

3. The UAV WTRU of claim 1, wherein the security key information is received from session management function (SMF) associated with the network.

4. The UAV WTRU of claim 1, wherein the UAV ID is sent to the network in a request message, wherein the request message indicates a request for a communication session, wherein the security key information is received in a response message, wherein the response message indicates a response associated with the request for the communication session, and wherein the connection to the third-party service provider is established via the communication session.

5. The UAV WTRU of claim 1, wherein the security key information a binds the UAV ID, a generic public subscription identifier (GPSI), and an ID of the third-party service provider.

6. The WTRU of claim 5, wherein the UAV ID, the GPSI, and the ID of the third-party service provider are bound cryptographically.

7. The WTRU of claim 1, wherein the security key information is associated with an ID of the third-party service provider.

8. The WTRU of claim 1, wherein the third-party service provider provides unmanned aerial system (UAS) traffic management.

9. The WTRU of claim 1, wherein the establishment of the connection to the third-party service provider comprises sending an UAV application session request message to the third-party service provider.

10. The WTRU of claim 1, wherein the establishment of the connection to the third-party service provider comprises receiving, from the third-party service provider, an authorization message for an unmanned aerial system (UAS) operation, and wherein the processor is further configured to send or receive information associated with the UAS operation using the established connection.

11. A network device, comprising:
a processor configured to:
  receive a registration request from a wireless transmit/receive unit (WTRU);
  determine a subscription based on the registration request, wherein the subscription is associated with the WTRU and is associated with an unmanned aerial vehicle (UAV) operation;
  send a subscription identifier to a third-party service provider, wherein the subscription identifier is associated with the WTRU;
  receive, from the third-party service provider, security key information that indicates an authorization of a connection between the WTRU and the third-party service provider; and
  send the security key information to the WTRU.

12. The network device of claim 11, wherein the security key information is sent via a protocol data unit (PDU) session establishment procedure.

13. The network device of claim 11, wherein the processor is further configured to receive a request message from the WTRU, wherein the request message indicates a request for a communication session and indicates an UAV identifier (ID) associated with the WTRU, and wherein the security key information is sent in a response message, wherein the response message indicates a response associated with the request for the communication session.

14. The network device of claim 11, wherein the security key information is received from session management function (SMF) associated with the network device.

15. The network device of claim 11, wherein the security key information is associated with an ID of the third-party service provider.

16. The network device of claim 11, wherein the third-party service provider comprises an unmanned aerial system (UAS) service supplier.

17. A method performed by a wireless transmit/receive unit associated with an unmanned aerial vehicle (UAV), comprising:
   sending a UAV identifier (ID) to a network;
   receiving, from the network, security key information associated with the UAV ID, wherein the security key information indicates an authorization of a connection to a third-party service provider; and
   establishing, based on the security key information, the connection to the third-party service provider to communicate with the third-party service provider.

18. The method of claim 17, wherein the security key information is received via a protocol data unit (PDU) session establishment procedure.

19. The method of claim 17, wherein the security key information is received from session management function (SMF) associated with the network.

20. The method of claim 17, wherein the UAV ID is sent to the network in a request message, wherein the request message indicates a request for a communication session, wherein the security key information is received in a response message, wherein the response message indicates a response associated with the request for the communication session, and wherein the connection to the third-party service provider is established via the communication session.

* * * * *